United States Patent
Browne, III et al.

(10) Patent No.: US 12,076,787 B2
(45) Date of Patent: Sep. 3, 2024

(54) FAULT DETECTION FOR ITERATIVE LEARNING CONTROL OF TIME-VARYING SYSTEMS

(71) Applicant: NUCOR CORPORATION, Charlotte, NC (US)

(72) Inventors: Florian Maurice Browne, III, Topeka, KS (US); George T. C. Chiu, West Lafayette, IN (US); Neera Jain Sundaram, West Lafayette, IN (US); Harold Bradley Rees, Ladoga, IN (US)

(73) Assignee: NUCOR CORPORATION, Charlotte, NC (US)

( * ) Notice: Subject to any disclaimer, the term of this patent is extended or adjusted under 35 U.S.C. 154(b) by 316 days.

(21) Appl. No.: 17/771,750

(22) PCT Filed: Oct. 28, 2020

(86) PCT No.: PCT/US2020/057685
§ 371 (c)(1),
(2) Date: Apr. 25, 2022

(87) PCT Pub. No.: WO2021/086929
PCT Pub. Date: May 6, 2021

(65) Prior Publication Data
US 2022/0379372 A1  Dec. 1, 2022

Related U.S. Application Data
(60) Provisional application No. 62/926,931, filed on Oct. 28, 2019.

(51) Int. Cl.
*B22D 46/00* (2006.01)
*B22D 11/18* (2006.01)
*G05B 23/02* (2006.01)

(52) U.S. Cl.
CPC ............ *B22D 46/00* (2013.01); *B22D 11/188* (2013.01); *G05B 23/0262* (2013.01)

(58) Field of Classification Search
CPC .. B22D 46/00; B22D 11/188; B22D 11/0622; B22D 11/16; G05B 23/0262
See application file for complete search history.

(56) References Cited

U.S. PATENT DOCUMENTS

| | | |
|---|---|---|
| 6,085,183 A | 7/2000 | Horn et al. |
| 2008/0047981 A1 | 2/2008 | Nikolovsky et al. |
| 2019/0091761 A1 | 3/2019 | Browne, III et al. |

FOREIGN PATENT DOCUMENTS

| | | |
|---|---|---|
| KR | 10-0860322 | 9/2008 |
| WO | 2012019213 | 2/2012 |

OTHER PUBLICATIONS

International Search Report regarding PCT/US2020/057685, dated Feb. 9, 2021 (2 pgs.).

(Continued)

*Primary Examiner* — Kevin P Kerns
*Assistant Examiner* — Steven S Ha
(74) *Attorney, Agent, or Firm* — Hahn Loeser & Park LLP

(57) ABSTRACT

A twin roll casting system includes a pair of counter-rotating casting rolls having an adjustable nip therebetween, a casting roll controller configured to adjust the nip between the casting rolls in response to control signals; a cast strip sensor measuring a parameter of the cast strip and generating strip measurement signals; and an iterative learning control (ILC) controller receiving the strip measurement signals and providing control signals to the casting roll controller. The ILC controller includes a fault detection algorithm receiving the control signals and the strip measurement signals and generating a fault detection signal indicating when a fault condition is detected and an iterative learning control algo- (Continued)

rithm to generate the control signals. The fault detection algorithm indicates a fault condition when it detects the control signal exceeding an upper control saturation threshold or the ILC controller operating a state that is not guaranteed as stable.

20 Claims, 7 Drawing Sheets

(56) References Cited

OTHER PUBLICATIONS

Written Opinion of the International Searching Authority regarding PCT/US2020/057685, dated Feb. 9, 2021 (5 pgs.).

FAULT DETECTION FOR ITERATIVE LEARNING CONTROL OF TIME-VARYING SYSTEMS

CROSS-REFERENCE TO RELATED APPLICATIONS

The present application is a National Stage Entry of International Patent Application serial number PCT/US20/57685, filed Oct. 28, 2020, entitled "FAULT DETECTION FOR ITERATIVE LEARNING CONTROL OF TIME-VARYING SYSTEMS,"; which claims priority from U.S. Provisional Application Ser. No. 62/926,931, filed Oct. 28, 2019, entitled "FAULT DETECTION FOR ITERATIVE LEARNING CONTROL SYSTEMS,".

BACKGROUND

Iterative learning control (ILC) is a control methodology especially suited for processes that are repetitive in nature. When applying ILC in practice, the algorithm should be designed to ensure that 1) the system will remain stable, and 2) that the performance specifications are met. However, these objectives may conflict with each other, particularly when the plant model includes uncertainty and/or iteration-varying dynamics.

Recent research has examined convergence and robustness characteristics of ILC algorithms applied to iteration varying or nonrepetitive systems. More specifically, prior research developed an optimal design procedure for ILC that balances the performance of the system against a robust stability criterion. The limitation of this approach, however, is that fulfilling the robust stability criterion requires knowledge of the upper bound of the input-output operator uncertainty. In some applications, the upper bound may be overly conservative during normal operation resulting in a conservative learning algorithm with poor performance. Furthermore, if there is uncertainty in the value of the bound that was used to design the ILC algorithm, then the ILC algorithm can become unstable if the plant violates that assumed upper bound.

SUMMARY

To avoid this possibility, and to potentially enable implementation of a more aggressive ILC algorithm, what is needed is an iterative learning controller having: 1. a fault detection algorithm that determines when it cannot be guaranteed that the ILC algorithm is asymptotically stable; and 2. a fault detection algorithm that determines when the ILC algorithm is not satisfying performance specifications, e.g. input saturation limits are being approached or exceeded.

Such an ILC controller with a fault detection algorithm is presented herein. The proposed algorithm can be extended to detect undesirable performance measures, such as control input saturation, in addition to detecting when stability is not guaranteed.

In one example, the fault detection techniques may be applied to an ILC control for a twin roll thin strip steel plant. A twin roll casting system includes a pair of counter-rotating casting rolls having a nip between the casting rolls and capable of delivering cast strip downwardly from the nip, the nip being adjustable, a casting roll controller configured to adjust the nip between the casting rolls in response to control signals; a cast strip sensor capable of measuring at least one parameter of the cast strip and generating strip measurement signals; and an iterative learning control (ILC) controller coupled to the cast strip sensor to receive strip measurement signals from the cast strip sensor and coupled to the casting roll controller to provide control signals to the casting roll controller. The ILC controller includes a fault detection algorithm receiving the control signals and the strip measurement signals and generating a fault detection signal to indicate when a fault condition is detected and an iterative learning control algorithm to generate the control signals based on the strip measurement signals and the fault detection signal. The fault detection algorithm indicates a fault condition when it detects at least one of the control signal exceeding an upper control saturation threshold or the ILC controller operating a state that is not guaranteed as stable. In one example, the cast strip sensor measures the cast strip for at least one periodic disturbance and the iterative learning control algorithm is adapted to decrease a severity of the at least one periodic disturbance.

In one example, an infinity norm ($\infty$-norm) of the control signal is compared to the upper control saturation threshold. In one example, a lower control saturation threshold, and the fault detection algorithm indicates a fault condition if an infinity norm ($\infty$-norm) of the control signal exceeds the upper control saturation threshold, and the fault detection algorithm does not indicate a fault condition if the infinity norm of the control signal is less than the lower control saturation threshold. If the infinity norm of the control signal is between the upper and lower control saturation thresholds, the fault detection algorithm indicates a fault condition if a p-norm of an error signal exceeds a threshold which varies as a function of the infinity-norm of the control signal.

The fault detection algorithm may determine that the ILC controller is operating in a state which is not guaranteed to be stable when a current p-norm of the error signal is greater than an initial p-norm of the error signal. In another example, the fault detection algorithm determines that the ILC controller is operating in a state which is not guaranteed to be stable when a p-norm of the control signal is increasing.

The ILC controller may be configured to re-tune one or more iterative learning control algorithm filters in response to the fault detection signal indicating a fault condition.

In one example, the cast strip sensor comprises a thickness gauge that measures a thickness of the cast strip in intervals across a width of the cast strip.

In one example, the casting roll controller further comprises a dynamically adjustable wedge controller and the nip is adjusted by the wedge controller in response to the control signals from the ILC controller. In another example, the casting rolls include expansion rings to adjust the nip and casting roll controller controls the expansion rings in response to the control signals from the ILC controller.

Another aspect of the invention includes a method of reducing periodic disturbances in a cast strip metal product in a twin roll casting system having a pair of counter-rotating casting rolls producing the cast strip at a nip between the casting rolls, the nip being adjustable by a casting roll controller, an iterative learning control algorithm generating a control signal, and a fault detection algorithm generating a fault detect signal. The method includes providing the control signal to the casting roll controller; measuring at least one parameter of the cast strip; calculating an error signal based on the control signal and the at least one parameter of the cast strip; providing the control signal and the error signal to the fault detection algorithm; Indicating a fault condition via a fault detection signal when the fault detection algorithm determines that an infinity-norm of the control signal exceeds an upper threshold; and generating control signals for the casting roll controller by the iterative learning control algorithm based on the error signal and the fault detection signal. The casting roll controller adjusts the nip in response to the control signals from the iterative learning control algorithm to reduce the periodic disturbances.

In some examples, the method further comprises a lower threshold, and the fault detection algorithm indicates a fault condition if the infinity norm (co-norm) of the control signal exceeds the upper threshold, and the fault detection algorithm does not indicate a fault condition if the infinity norm of the control signal is less than the lower threshold. If the infinity-norm of the control signal is between the upper and lower thresholds, the fault detection algorithm indicates a fault condition if a p-norm of an error signal exceeds a threshold which varies as a function of the infinity-norm of the control signal.

The method may further comprise the step of generating a fault detection signal by the fault detection algorithm when a current p-norm of the error signal is greater than an initial p-norm of the error signal. The method may further comprise the step of generating a fault detection signal by the fault detection algorithm when a current p-norm of the control signal is increasing. The method may further comprise the step of detuning one or more iterative learning controller filters in response to the fault detect signal indicating a fault.

The method may further comprise the casting roll controller controlling a dynamically adjustable wedge controller and the nip is adjusted by the wedge controller in response to the control signals. The method may further comprise the casting roll controller controlling expansion rings in response to the control signals.

A twin roll casting system including an iterative learning control (ILC) controller with fault detection is provided. The twin roll casting system includes a pair of counter-rotating casting rolls having a nip between the casting rolls and capable of delivering cast strip downwardly from the nip, the nip being adjustable, a casting roll controller configured to adjust the nip between the casting rolls in response to control signals; a cast strip sensor capable of measuring at least one parameter of the cast strip and generate strip measurement signals; and an iterative learning control (ILC) controller coupled to the cast strip sensor to receive strip measurement signals from the cast strip sensor and coupled to the casting roll controller to provide control signals to the casting roll controller. The ILC controller includes a fault detection algorithm receiving the control signals and the strip measurement signals and generating a fault detection signal to indicate when a fault condition is detected and an iterative learning control algorithm to generate the control signals based on the strip measurement signals and the fault detection signal. The fault detection algorithm indicates a fault condition when it detects that the ILC controller is operating a state that is not guaranteed as stable or when the ILC controller is not meeting predefined performance specifications.

DETAILED DESCRIPTION

Figure 1:
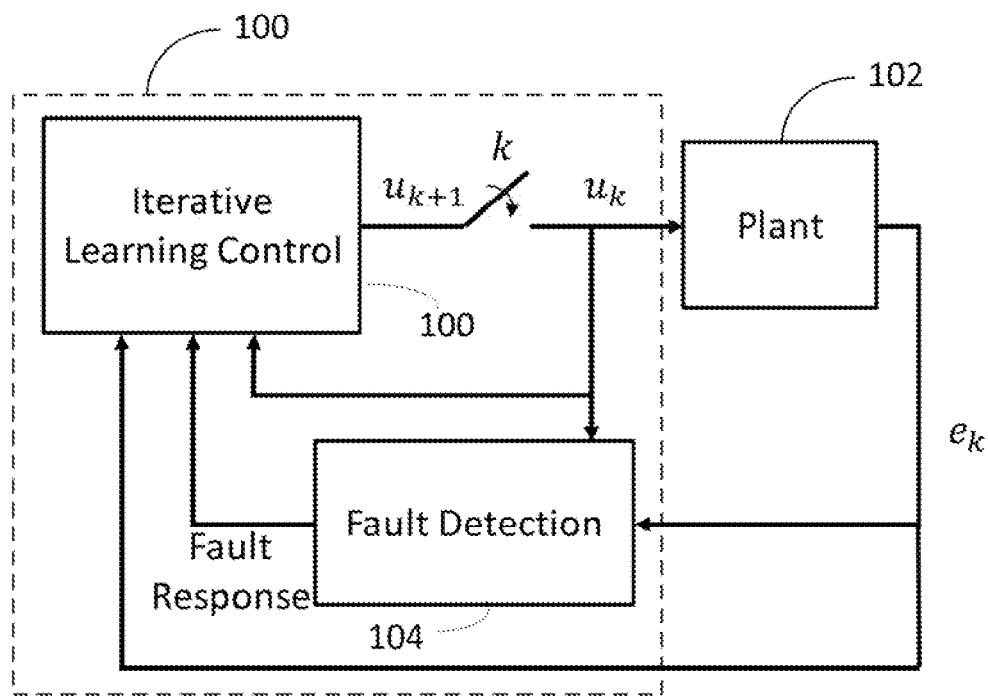
FIG. 1 is a block diagram of an ILC Controller with fault detection according to one aspect of the present invention providing control signals to a Plant.

Referring to FIG. 1, an ILC Controller 100 according to one aspect of the present invention controls a plant 102. The plant 102 may comprise a potentially nonrepetitive system. The ILC Controller 100 comprises an ILC algorithm 106 and a fault detection algorithm 104. The fault detection algorithm 104 detects when the ILC algorithm 106 applied to plant 102 either 1) violates assumptions used to guarantee asymptotic stability or 2) is not meeting predefined performance specifications or both. The fault detection algorithm 104 generates a fault detection signal indicating a fault condition if operating conductions or stability requirements are not met.

U and Y are assumed to be Banach spaces with suitable norms and $\|\cdot\|$ is used to denote vector and induced operator norms in the appropriate spaces. In some embodiments, the class of ILC systems comprises linear time invariant systems of the form:

$$y_k = P_k u_k + d_k, \forall k \in \mathbb{N} \quad (1)$$

where $y_k \in Y$ is the output signal, $u_k \in U$ is the input signal, $d_k \in Y$ is the exogenous signal including disturbances and the initial conditions effects, and $P_k \in B(U,Y)$ is the input-output operator, all defined at iteration k. Other classes of ILC systems may also be suitable or used in consideration with fault detection.

In this example, the plant model is bounded-input bounded-output (BIBO) stable for all $k \in \mathbb{N}$ and that the ILC algorithm's objective is to make the tracking error between the output $y_k$ and a predefined reference signal $r_k$ converge to a small neighborhood of zero, where the tracking error $e_k$ is defined as:

$$e_k = r_k - y_k, \forall k \in \mathbb{N}. \quad (2)$$

To achieve this objective, a general, linear, iteration-invariant ILC algorithm that is commonly used for robust ILC may be employed:

$$u_{k+1} = Qu_k + Le_k, \forall k \in \mathbb{N}, \quad (3)$$

where Q and L are filters that are to be designed and $u_0 \in U$ is an initial input.

The choice of Q (the input signal filter) and L (the error signal filter) in (3) typically depends on balancing a tradeoff between performance and robust stability. A common assumption in robust ILC is that $\|P_k\|_\infty$ is bounded above, meaning that the uncertainty in the plant model is bounded. This assumption enables the contraction mapping stability criterion that is commonly used when designing an ILC algorithm.

One design approach is to choose Q and L such that certain asymptotic stability guarantees may be made. The necessary and sufficient condition for the asymptotic stability of the ILC system described by (1), (2), and (3) is:

$$\rho(Q-LP_k)<1, \forall k \in \mathbb{N},$$

where $\rho(\bullet)$ is the spectral radius operator. Due to the difficulty in calculating the spectral radius, however, the following sufficient asymptotic stability condition can be used to design the ILC filters:

$$\|Q-LP_k\|_\infty<1. \qquad (4)$$

in one approach, an optimal design procedure is described by solving an optimization problem which balances the performance of the system against a robust stability criterion. The limitation to this approach, however, is that fulfilling the robust stability criterion requires knowledge of the upper bound of the input-output operator uncertainty.

In some embodiments, the upper bound may be much larger than the value of $\|P_k\|_\infty$ during normal operation. Using this bound for designing the ILC algorithm in those applications may result in a conservative learning algorithm with poor performance. Furthermore, if there is uncertainty in the value of the bound that was used to design the ILC algorithm, then the ILC algorithm can become unstable if the plant violates that assumed upper bound.

The fault detection algorithm considers the values of the p-norms $\|e_k\|_p$ and $\|u_k\|_p$ and their history in the iteration index k. For the fault detection algorithm, the following definition is applied, which enables the categorization of the operation of the ILC algorithm as either faulty or satisfactory.

A set of stable and satisfactory operating conditions can be defined by combining inequalities of the form $$a\|e_k\|_p \leq b\|u_k\|_p + c, a,b,c \in \mathbb{R}. \qquad (5)$$

The fault detection algorithm's objective is to detect when the union of all stable and satisfactory operation conditions is violated. In other words, a fault is classified as a breech in any or all stable and satisfactory operating conditions defined in the form (5).

Regarding the case of detecting when the ILC algorithm cannot be guaranteed to be asymptotically stable, one approach is to use an assumed value of the upper bound of $\|P_k\|_\infty$ and then design the ILC algorithm so that the ILC system described by (1), (2), (3) satisfies a sufficient condition for asymptotic stability.

To enable the fault detection algorithm in some embodiments, the following is used to define a region of stable operating conditions. Consider the ILC system described by (1), (2), and (3), a set of asymptotically stable operating conditions may be defined by the inequality:

$$\|e_k\|_2 \geq -\frac{1-\|Q\|_\infty}{\|L\|_\infty}\|u_k\|_2 + \|r_k - d_k\|_2. \qquad (6)$$

To prove this the triangle inequality is applied to (4) and a more conservative stability condition is produced.

$$\|Q-LP_k\|_\infty \leq \|Q\|_\infty + \|LP_k\|_\infty \leq \|Q\|_\infty + \|L\|_\infty \|P_k\|_\infty < 1. \qquad (7)$$

If the ILC algorithm is designed using this stability condition, then this condition can be used to provide an upper bound on $\|P_k\|_\infty$ that determines the limit of the size $\|P_k\|_\infty$ before (7) is violated. This upper bound is found by recognizing that the norm function returns a nonnegative value and then solving (7) for $\|P_k\|_\infty$:

$$\|P_k\|_\infty < \frac{1-\|Q\|_\infty}{\|L\|_\infty}. \qquad (8)$$

Then the triangle inequality is applied to the norm of (2) to obtain the following lower limit of $\|e_k\|_\infty$ given the ILC algorithm defined in (3):

$$\|e_k\|_2 = \|r_k - P_k u_k - d_k\|_2$$
$$\geq |\|r_k - d_k\|_2 - \|P_k u_k\|_2|.$$
$$\geq \|r_k - d_k\|_2 - \|P_k u_k\|_2$$

Rearranging the terms, using the multiplicative property of norms, and applying (8) results in $$\|r_k - d_k\|_2 - \|e_k\|_2 \leq \|P_k u_k\|_2$$
$$\leq \|P_k\|_\infty \|u_k\|_2$$
$$\leq \frac{1-\|Q\|_\infty}{\|L\|_\infty}\|u_k\|_2$$

Rearranging the terms results in the following inequality, which yields a criterion for an acceptable value of $\|e_k\|_2$ $$\|e_k\|_2 \geq -\frac{1-\|Q\|_\infty}{\|L\|_\infty}\|u_k\|_2 + \|r_k - d_k\|_2.$$

The value of $\|r_k - d_k\|_2$ is a measure of the error when u=0, which can be obtained without applying ILC to the system. The set of asymptotically stable operating conditions described by (6) provides only a subset of the set of all asymptotically stable operating conditions. When the fault detection algorithm detects that (6) is violated, it does not necessarily mean that the system is unstable. It only means that asymptotic stability cannot be guaranteed based on the design approach used for the ILC algorithm.

If the ILC is designed such that $\|Q-LP_k\|<\gamma<1$ for all possible $P_k$, then the monotonic convergence condition will be satisfied. For this special case of guaranteed monotonic convergence, the norm of the input signal increases while the norm of error signal decreases or remains the same. Conversely, when an ILC algorithm begins to go unstable, the norms of the input and the error signals both start to increase. Using this information, a criterion may be constructed that examines the history of the norms of the error and input signals to detect when the algorithm starts to go unstable. One example of detecting stability is to examine whether or not both of the following conditions are simultaneously satisfied: 1) $\|e_k\|_2$ is not increasing; and 2) $\|u_k\|_2$ is not increasing. This condition can be expressed in the form (5) as the following two inequalities:

$$\|e_k\|_2 \leq 0\|u_k\|_2 + \|e_{k-1}\|_2, \text{ and}$$

$$0\|e_k\|_2 \leq -\|u_k\|_2 + \|u_{k-1}\|_2.$$

Regarding detection of unsatisfactory performance, performance specifications can be rewritten in the form of (5) in order to define operating conditions that demonstrate satisfactory performance. While there can be many types of performance specifications, three types of performance specifications that are commonly encountered are discussed herein: avoiding input saturation, attenuating process disturbances, and achieving tracking error convergence at a specific rate. A first type of performance fault that would be desirable to detect is when the system is close to an input saturation limit, $u_{sat}$. Input saturation can be detected by defining a satisfactory performance region using $p=\infty$, $a=0$, $b=-1$, $c=u_{sat}$ in (5).

Note that the same p-norm, $\|u\|_2$, that is used to detect when the ILC algorithm is violating the asymptotic stability design assumptions can also be used to detect input saturation faults by using the property $$\frac{\|a\|_2}{\sqrt{n}} \leq \|a\|_\infty$$

for a vector $a \in \mathbb{R}^n$. This relationship may be used to alternatively write the saturation satisfaction criterion as $$\|u_k\|_2 \leq u_{sat}\sqrt{N}$$

where N denotes the number of samples in each iteration. This saturation satisfactory criterion can be written in the form of (5) using $p=2$, $a=0$, $b=-1$, and $c=u_{sat}\sqrt{N}$. Using this approach means that the fault detection algorithm only needs to calculate one set of p-norms when detecting violations of the stable and satisfactory operating conditions.

A second type of performance fault that would be useful to detect is when the ILC algorithm causes the p-norm of the error signal to increase above the initial $\|e_0\|_p$. This would signify that the tracking error is being amplified in the p-norm sense and that the ILC algorithm is degrading the performance of the system rather than improving it. This type of fault can be detected by choosing $a=1$, $b=0$, and $c=\|e_0\|_p$, in (5) for any kind of p-norm.

A third type of performance fault that would be useful to detect is when the ILC algorithm is not converging in the 2-norm sense at a specific rate. If we have a desired convergence rate defined by $0<\gamma<1$, we can define a set of satisfactory operating conditions as:

$$\|e_k\|_2 < \gamma^k \|e_0\|_2$$

This is in the form of (5) with $p=2$, $a=1$, $b=0$, and $c=\gamma^k\|e_0\|_2$, which is a scalar value that changes with respect to the iteration index k.

To demonstrate the algorithm in simulation, the following plant is employed:

$$y_k = P_k u_k + \sin\left(\frac{2\pi t}{N}\right),$$

where $P_k$ is a scalar value that has a nominal value of 0.2 and is assumed to have an upper bound of 0.3. For each simulation, we collect $N=180$ samples per iteration.

An ILC algorithm may be constructed as follows:

$$u_{k+1} = 0.7u_k + 1.0(0.0 - y_k)$$

$$= 0.7u_k - y\_k$$

where $u_0=0$. This ILC algorithm, coupled with the described plant, satisfies the conservative stability requirement (7). Thus, the proposed instability detection criterion (6) can be analyzed for this system with $\|Q\|_\infty=0.7$, $\|L\|_\infty=1.0$, and $\|r_k-d\|_2=\sqrt{90}$.

To evaluate the effectiveness of the criterion given in (6) on the proposed ILC system, the plant is simulated with three cases of $P_k$. Case 1 is $P_k=0.2$, $\forall k \in \mathbb{N}$. Case 2 is $P_k=0.2+\delta_k$ where $\delta_k$ is a random number in $[-0.1, 0.1]$. Case 3 is $P_k=0.2$ for $k \leq 50$ and $P_k=0.5$ for $k>50$.

Figure 2:
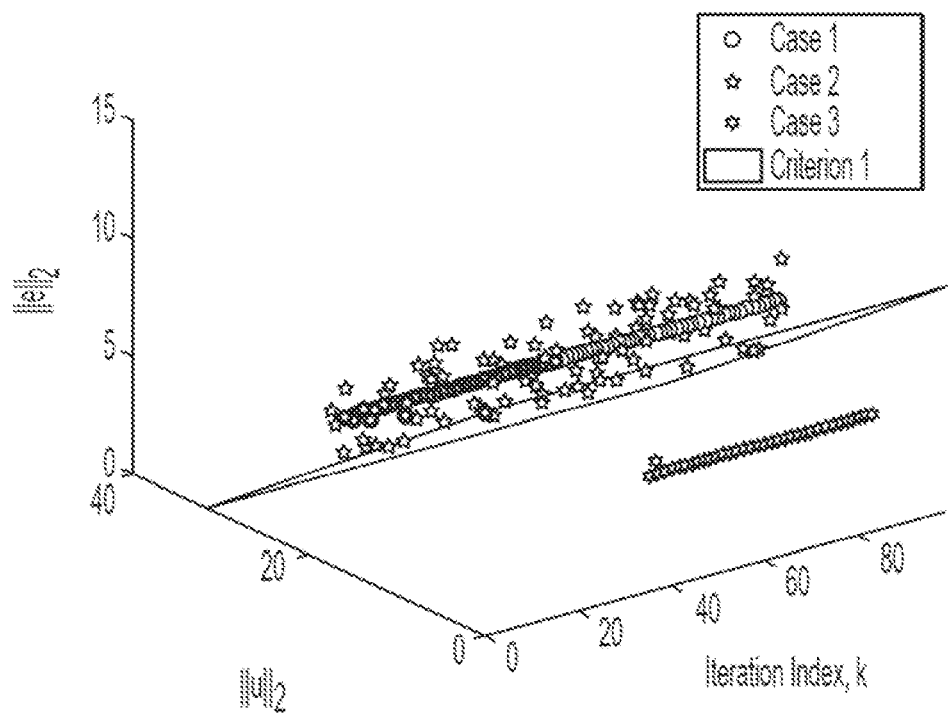
FIG. 2 is a graph of the 2-norms $\|e_k\|_2$ versus $\|u_k\|_2$ and versus iteration k with the fault detection criterion shown as a plane.

FIG. 2 shows a three dimensional plot of $\|e_k\|_2$ versus $\|u_k\|_2$ versus k with criteria (6) displayed as a plane in the three dimensional space. In case 1, the iteration-invariant plant allows the input and error signals to converge to a steady state value. This value is greater than zero due to using a value of $Q<1$, but the ILC controller achieves the control objective stated of making the error converge to a small bound around zero.

The control objective is also satisfied in case 2, where the norm of the input output operator is a random value between $\|P_k\|_\infty=0.1$ and $\|P_k\|_\infty=0.3$. In this case, the robust stability criteria (6) is satisfied for all values of $\|P_k\|_\infty$ and the pairs of $\|u_k\|_2$ and $\|e_k\|_2$ stay above the instability criterion plane. This can be clearly seen when examining FIG. 3, which is FIG. 2 projected onto the $\|u_k\|_2$ versus $\|e_k\|_2$ plane. In this projection, the criterion plane is condensed into a line on the $\|u_k\|_2$ versus $\|e_k\|_2$ plane and all of the data is above that line. Also, this view clearly shows that the values of $\|e_k\|_2$ are always less than $\|e_0\|_2$ which means that the iteration-invariant ILC algorithm was able to improve the performance despite operating on an iteration-varying plant.

Case 3 shows the first time the fault detection criterion is broken. In this case, when the value of $\|P_k\|_\infty$ changes to $\|P_k\|_\infty=0.5$ at iteration $k=50$, the ILC algorithm no longer satisfies (7). As we noted earlier, this does not mean that the system is unstable because (7) is only a sufficient condition. However, it does mean that the system is operating in a mode for which the ILC was not designed. In this example, the necessary and sufficient condition is calculated and it may be determined that the system will remain stable as long as $\|P_k\|_\infty<1.7$; but at $\|P_k\|_\infty$ approaches that upper limit, the transients of the error dynamics may cause the norm of the error to increase above $\|e_0\|_2$ in some iterations.

While the fault detection criterion (6) is capable of detecting when $\|P_k\|_\infty$ becomes slightly larger than the upper bound defined in the plant uncertainty model, it may not detect a case where $\|P_k\|_\infty$ becomes much larger than the upper bound used to tune the ILC. To detect those conditions, criterion (6) should be combined with a second fault detection check that examines the value of $\|e_k\|_2$ relative to the value of $\|e_0\|_2$. For example, satisfactory performance can be marked as the cross-sectional region where $\|e_k\|_2 \leq \|e_0\|_2$ and where (6) is satisfied.

As mentioned previously, in addition to avoiding instability, it is desirable to be able to detect situations when the ILC algorithm is not satisfying performance specifications. Criteria may be defined in the form of (5) to detect when the simulated plant may be violating input saturation constraints.

Figure 3:
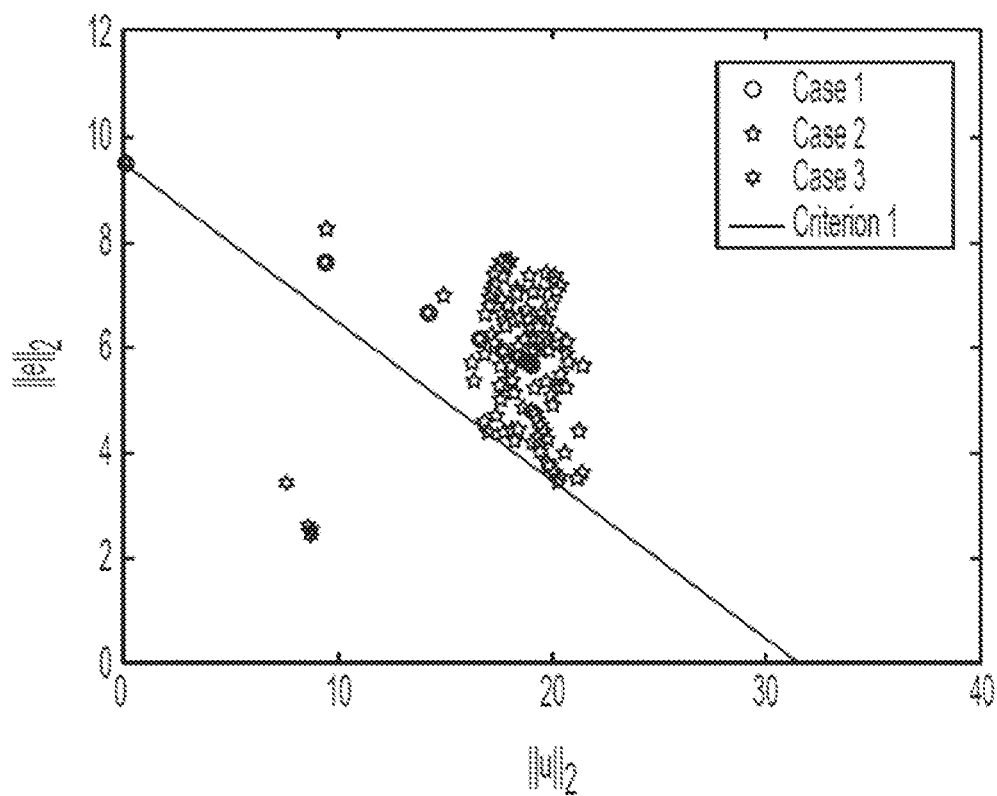
FIG. 3 is a graph of the 2-norms $\|e_k\|_2$ versus $\|u_k\|_2$ with the fault detection criterion shown as a line.
Figure 4:
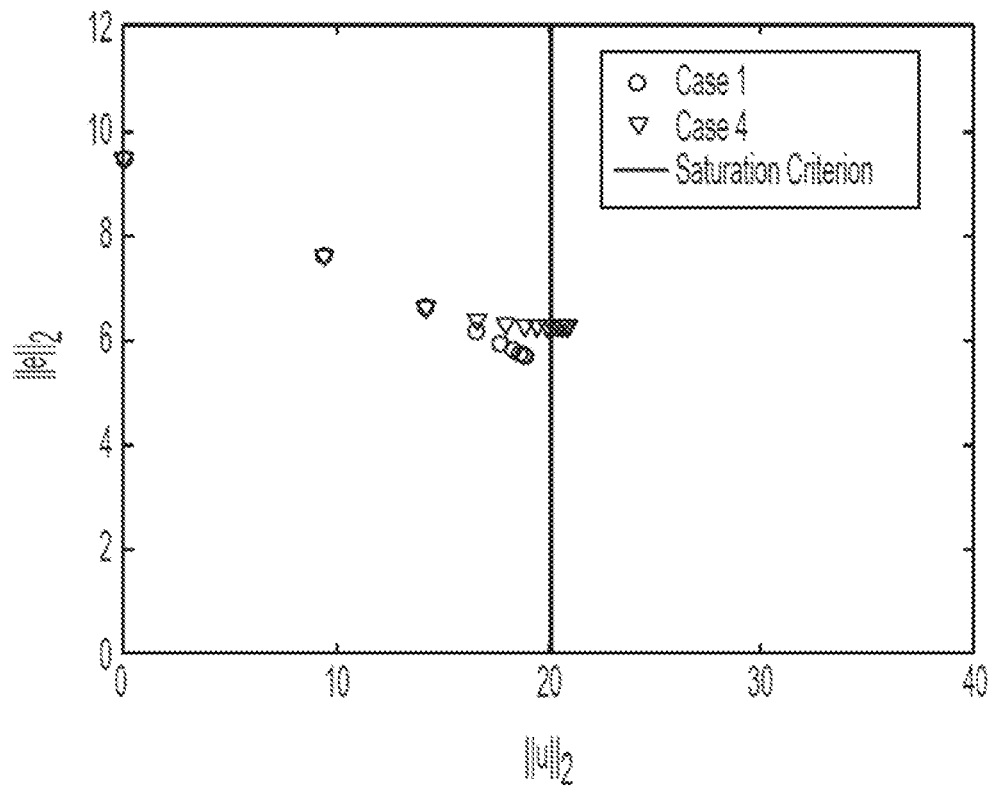
FIG. 4 is a graph of the 2-norms $\|e_k\|_2$ versus $\|u_k\|_2$ and for two cases of actuator saturation.

Case 4 of the simulation study is the same as case 1, i.e. $P_k=0.2$, $\forall k \in \mathbb{N}$, but we assume that the actuator has a saturation limit of $u_{sat}=1.5$. It is assumed that the input signal used in the ILC feedback is the input that is sent to the actuator and it does not reflect the saturation. In other words, $u_k$ may contain terms greater than $u_{sat}$ when it is used to calculate $u_{k+1}$. The result of the actuator saturation is shown in FIG. 3. In this case $\|u_k\|_2$ increases but $\|e_k\|_2$ does not decrease. This kind of unsatisfactory performance can be detected by defining a criterion of satisfactory performance of the form:

$$\|u_k\|_2 \leq u_{sat}\sqrt{180}=9\sqrt{5} \qquad (9)$$

The above fault detection techniques may be applied to a twin roll thin strip steel casting ILC Controller system as disclosed by the present inventors in U.S. Pat. No. 10,449,603, which is incorporated by reference. However, the above fault detection techniques are not limited in applicability to the control system disclosed in U.S. Pat. No. 10,449,603, and have general applicability to ILC Controller systems.

Figure 5:
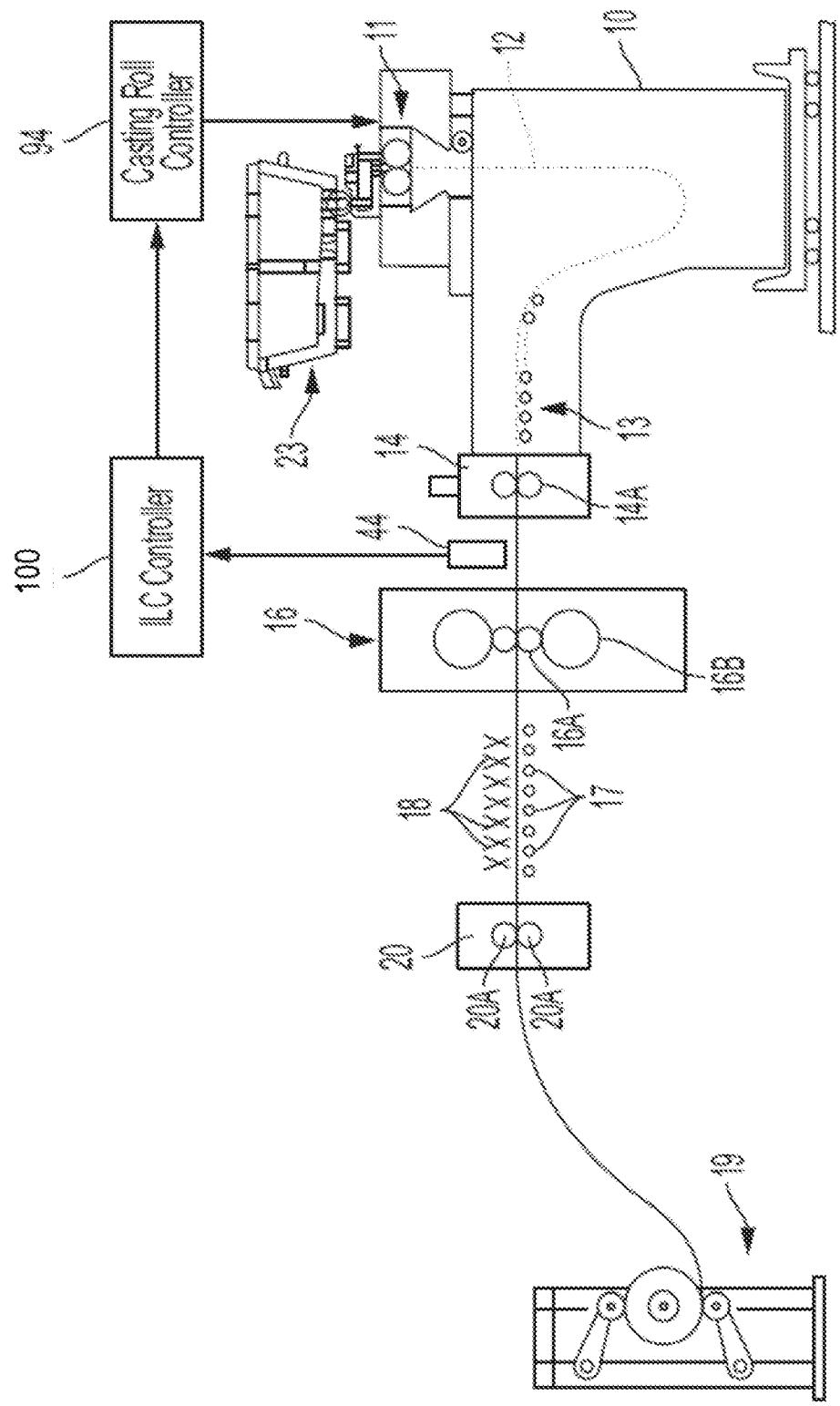
FIG. 5 is an illustration of a twin-roll caster employing an ILC Controller according to another aspect of the present invention.
Figure 6:
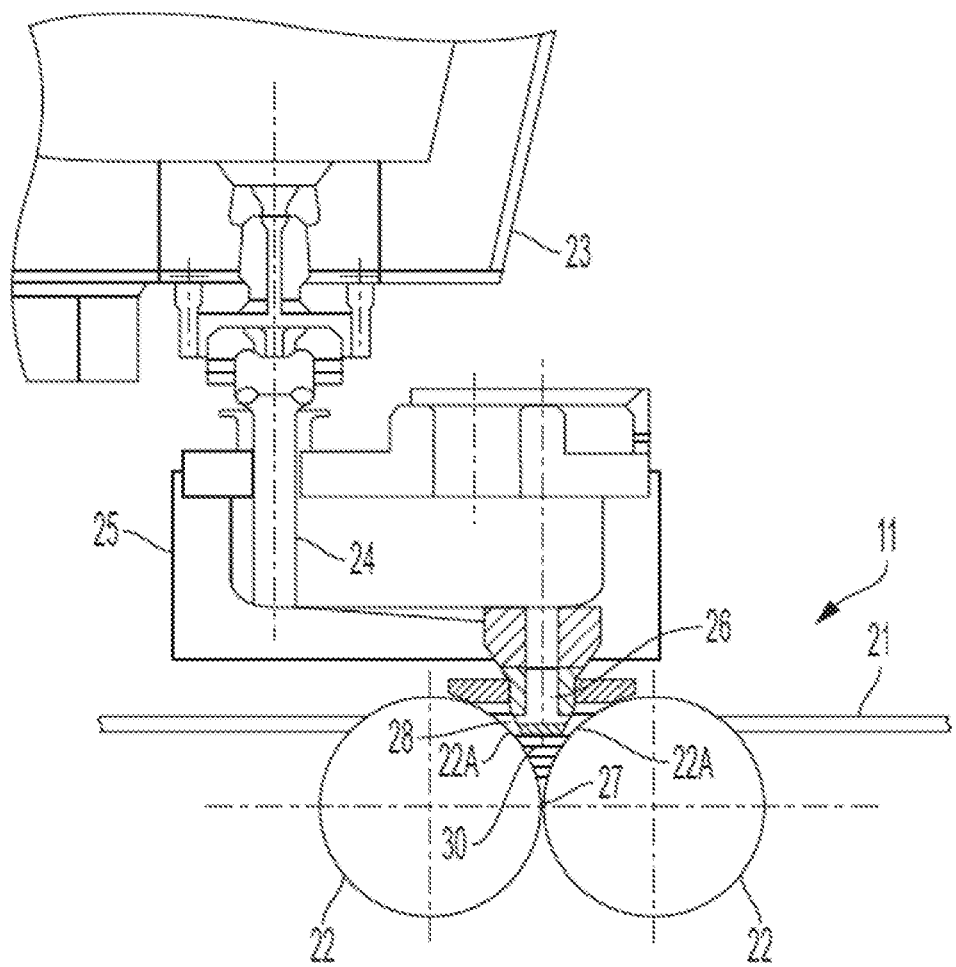
FIG. 6 is an illustration of additional details of the twin-roll caster of FIG. 5.
Figure 7:
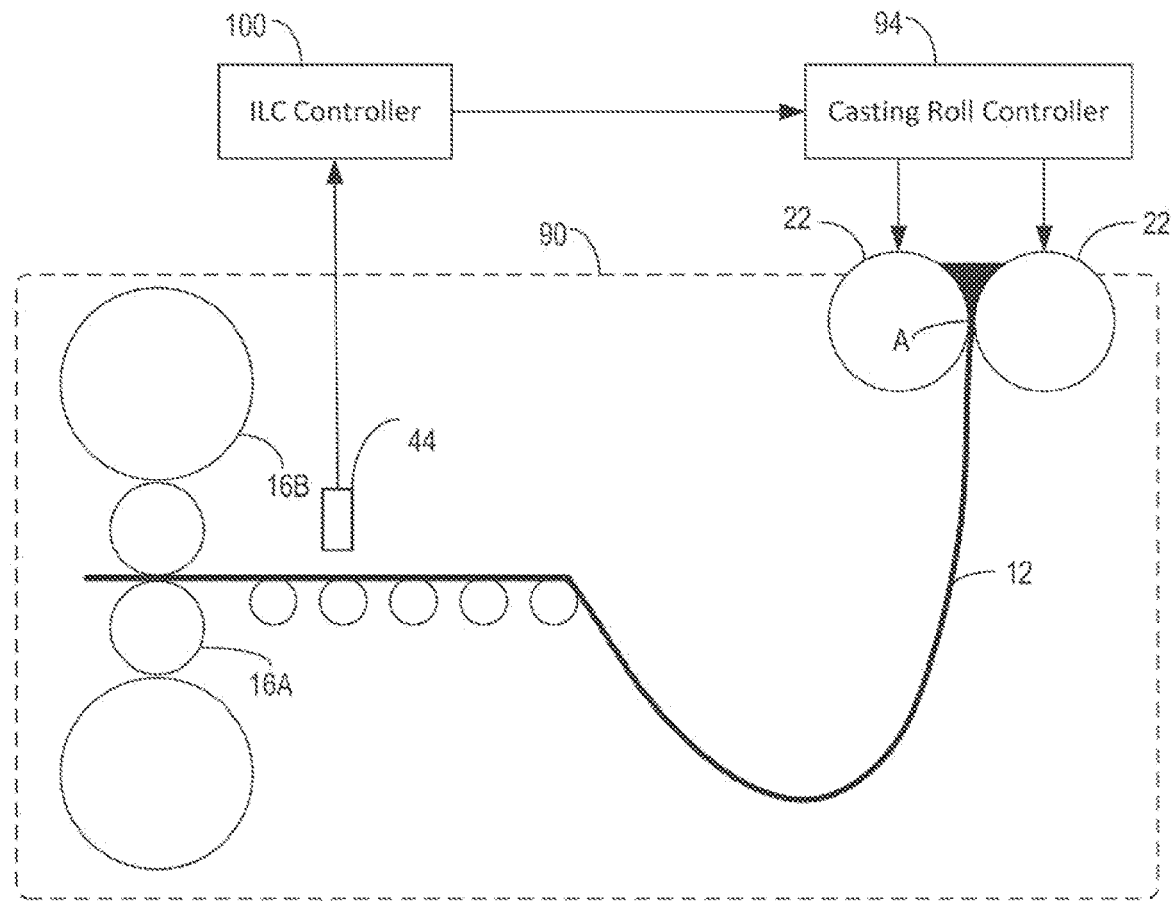
FIG. 7 is block diagram of a twin-roll caster employing an ILC Controller according to another aspect of the present invention.
Figure 8:
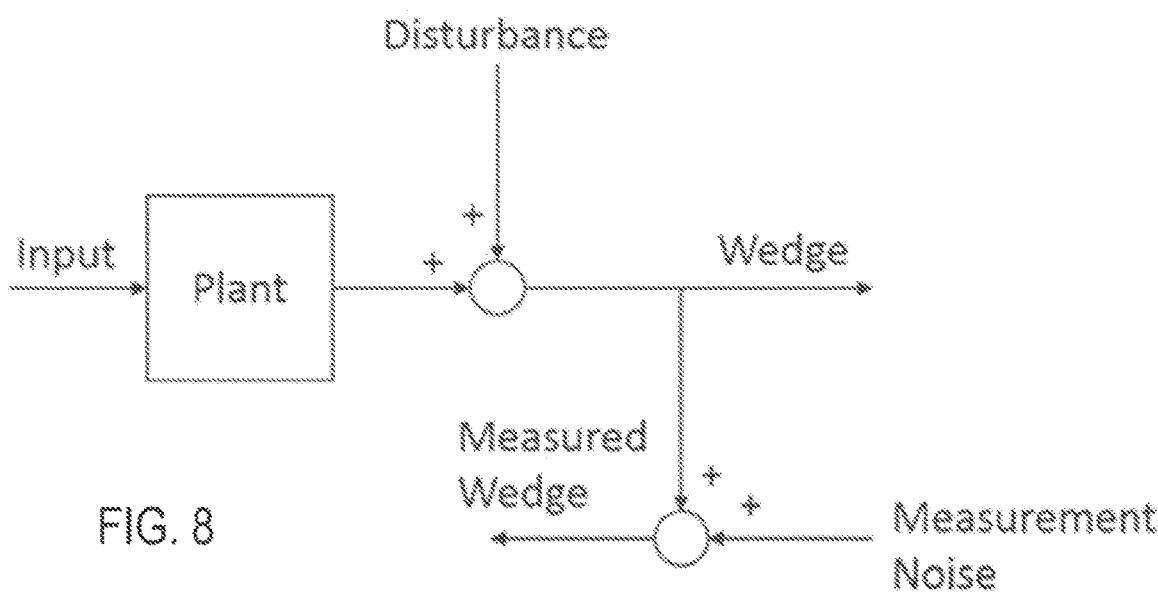
FIG. 8 is a block diagram of a wedge control system according to another aspect of the present invention.

According to one implementation of the above invention, referring to FIGS. 5, 6 and 7, a twin-roll caster is denoted generally by 11 which produces thin cast steel strip 12 which passes into a transient path across a guide table 13 to a pinch roll stand 14. After exiting the pinch roll stand 14, thin cast strip 12 passes into and through hot rolling mill 16 comprised of back up rolls 168 and upper and lower work rolls 16A where the thickness of the strip reduced. The strip 12, upon exiting the rolling mill 15, passes onto a run out table 17 where it may be forced cooled by water jets 18, and then through pinch roll stand 20 comprising a pair of pinch rolls 20A and to a coiler 19.

Twin-roll caster 11 comprises a main machine frame 21 which supports a pair of laterally positioned casting rolls 22 having casting surfaces 22A and forming a nip 27 between them. Molten metal is supplied during a casting campaign from a ladle (not shown) to a tundish 23, through a refractory shroud 24 to a removable tundish 25 (also called distributor vessel or transition piece), and then through a metal delivery nozzle 26 (also called a core nozzle) between the casting rolls 22 above the nip 27. Molten steel is introduced into removable tundish 25 from tundish 23 via an outlet of shroud 24. The tundish 23 is fitted with a slide gate valve (not shown) to selectively open and close the outlet 24 and effectively control the flow of molten metal from the tundish 23 to the caster. The molten metal flows from removable tundish 25 through an outlet and optionally to and through the core nozzle 26.

Molten metal thus delivered to the casting rolls 22 forms a casting pool 30 above nip 27 supported by casting roll surfaces 22A. This casting pool is confined at the ends of the rolls by a pair of side dams or plates 28, which are applied to the ends of the rolls by a pair of thrusters (not shown) comprising hydraulic cylinder units connected to the side dams. The upper surface of the casting pool 30 (generally referred to as the "meniscus" level) may rise above the lower end of the delivery nozzle 26 so that the lower end of the deliver nozzle 26 is immersed within the casting pool.

Casting rolls 22 are internally water cooled by coolant supply (not shown) and driven in counter rotational direction by drives (not shown) so that shells solidify on the moving casting roll surfaces and are brought together at the nip 27 to produce the thin cast strip 12, which is delivered downwardly from the nip between the casting rolls.

Below the twin roll caster 11, the cast steel strip 12 passes within a sealed enclosure 10 to the guide table 13, which guides the strip to a pinch roll, stand 14 through which it exits sealed enclosure 10. The seal of the enclosure 10 may not be complete, but is appropriate to allow control of the atmosphere within the enclosure and access of oxygen to the cast strip within the enclosure. After exiting the sealed enclosure 10, the strip may pass through further sealed enclosures (not shown) after the pinch roll stand 14.

Before the strip enters the hot roll stand, the transverse thickness profile is obtained by thickness gauge 44 and communicated to ILC Controller 92. It is in this location that the wedge is measured by subtracting the thickness measurement of one side from the other. To distinguish these sides from one another, one side is designated as the drive side (DS) and the other side as the operator side (OS). Then the amount of the wedge is the DS thickness minus the OS thickness. The ILC controller provides input to the casting roll controller 94 which, for example, may control nip geometry.

In a typical cast, the wedge varies as a function of the roll's angular position. As the roll rotates, the changes in the eccentricity of the roll coupled with the thermal variations on the roll's surface can cause the wedge to shift from being biased toward one side to biased toward the other. Then, as the next revolution begins, the wedge signal reverts to being biased toward the first side and the cycle continues. The rotational period may be approximately 1.5 seconds. Wedge behavior may be periodic at both the rotational frequency and twice the rotational frequency.

The main actuation variable for regulating the thickness profile is the gap created because of positioning the casting rolls. This gap is referred to as the nip. To reduce wedge defects, an ILC requires a plant model that maps how a nip reference signal affects the wedge measurement in the hot box. One control that affects wedge is "tilt", which denotes the difference between the gap distances as measured on the drive side and operator side, respectively.

To identify a system model, a square wave may be applied as an input tilt control signal, denoted as u. For an output signal cast strip thickness may be measured at the thickness gauge to measure the effect of the input tilt signal on wedge. The thickness gauge may be located on the roll out table before the hot rolling mill. The resulting wedge signal is designated $X_W$. It is the sum of the input tilt control signal, measurement noise, and a periodic disturbance signal, as shown schematically in FIG. 7. The plant's response to the input signal is summed with measurement noise and a periodic disturbance signal to reconstruct the measured signal.

The dynamic response of the square wave may be masked by the presence of the disturbance and noise signals. Significant measurement noise may exist above 1.5 Hz which can hinder the plant identification process. To reduce the effect of these signals on plant model creation, the measured signals may be filtered using a set of band-stop and low pass filters. The two periodic disturbances for example may be removed in MATLAB using the filtfilt command with two third-order, Butterworth band-stop filters: one with cutoff frequencies at 3 rad/sec and 6 rad/sec and another with cutoff frequencies at 6 rad/sec and 10 rad/sec. The high frequency noise is then removed in a similar fashion using a sixth-order, low pass Butterworth filter with a cutoff frequency of 9 rad/sec.

In addition to the noise, the plant model identification is further complicated by the presence of a substantial delay between the tilt dynamics and the wedge measurement. As shown in FIG. 6, the strip leaves the casting rolls and enters the hot box where it forms a loop before being fed into the hot rolling stand. The wedge measurement location is downstream of the loop, on the table rolls that feed the strip into the hot roll stand. The amount of time between when the strip leaves the casting rolls and when the wedge is measured can be long enough such that multiple roll revolutions occur. To identify a plant model to be used for designing an ILC controller, the wedge signal is shifted by approximately 5 roll revolutions to compensate for this measured delay.

The filtered and wedge measurement signal, $X_{W_f}$ may then be used to identify the plant model. This is accomplished by assuming that the plant can be described by a polynomial of the form $$A(x)X_{W_f}(t)=B(z)u(t), \tag{10}$$

where t is the sample index and A and B are polynomials in terms of z, which is the forward shift operator in the t (sample) domain. As an example, a polynomial model given by:

$$X_{W_s}(t) = 0.186 z^{-671} u(t), \quad (11)$$

is able to achieve a normalized root mean square error fit percentage of 81.65%.

The measurement delay discussed previously introduces a phase lag of $\omega T = 57.3$ radians which makes traditional feedback controllers practically infeasible. The identified plant model described above may be used to synthesize an iterative learning controller that can overcome the phase lag introduced by the delay. A standard ILC algorithm is given by:

$$u(t, k+1) = u(t, k) + Le(t, k), \quad (12)$$

where u is the tilt control input at sample t within roll revolution k and e is the error, which is defined to be the negative of the wedge signal.

Based on the plant model, the error can be rewritten as:

$$e(t, k) = -(B(z)/A(z))u(t, k) + D(t)), \quad (13)$$

where D(t) is the periodic disturbance signal, that does not depend on the iteration index, k. This results in a control law given by:

$$u(t, k+1) = [1 - L(B(z)/A(z))]u(t, k) - L(z)D(t). \quad (14)$$

Then the convergence condition for the contractive mapping of u(t,k) to u(t,k+1) is given by:

$$\|1 - L(B(z)/A(z))\|_\infty = \max_{-\pi < \omega < \pi} |1 - L(B(e^{j\omega})/A(e^{j\omega}))| < 1. \quad (15)$$

This mapping ensures that u(t,k) converges to a value that minimizes the tracking error. The condition is satisfied, for Eqn. (11), as long as $$0 \leq L \leq 10.87.$$

Equation (12) applies if there is no measurement delay. However, as discussed above, there is a significant measurement delay equal to roll revolutions. To compensate for this, we modify the controller to the form $$u(t, k+\bar{n}_k+1) = u(t, k) + Lq^{\bar{n}_k} e(t, k), \quad (16)$$

where q is the forward shift operator in the k domain and $\bar{n}_k$ is the smallest positive integer that satisfies $\bar{n}_k T_R > \Delta T$ where $T_R$ is the period of one roll revolution and $\Delta T$ is the measurement delay. This modification does not affect the gain bounds because the convergence condition becomes:

$$\|1 - L(B(z)/A(z))\|_\infty < 1, \quad (17)$$

which results in the same bounds for L.

This type of controller can also be thought of as an ILC algorithm where the iteration period is every $\bar{n}_k$ revolutions instead of on a per-revolution basis.

Figure 9A:
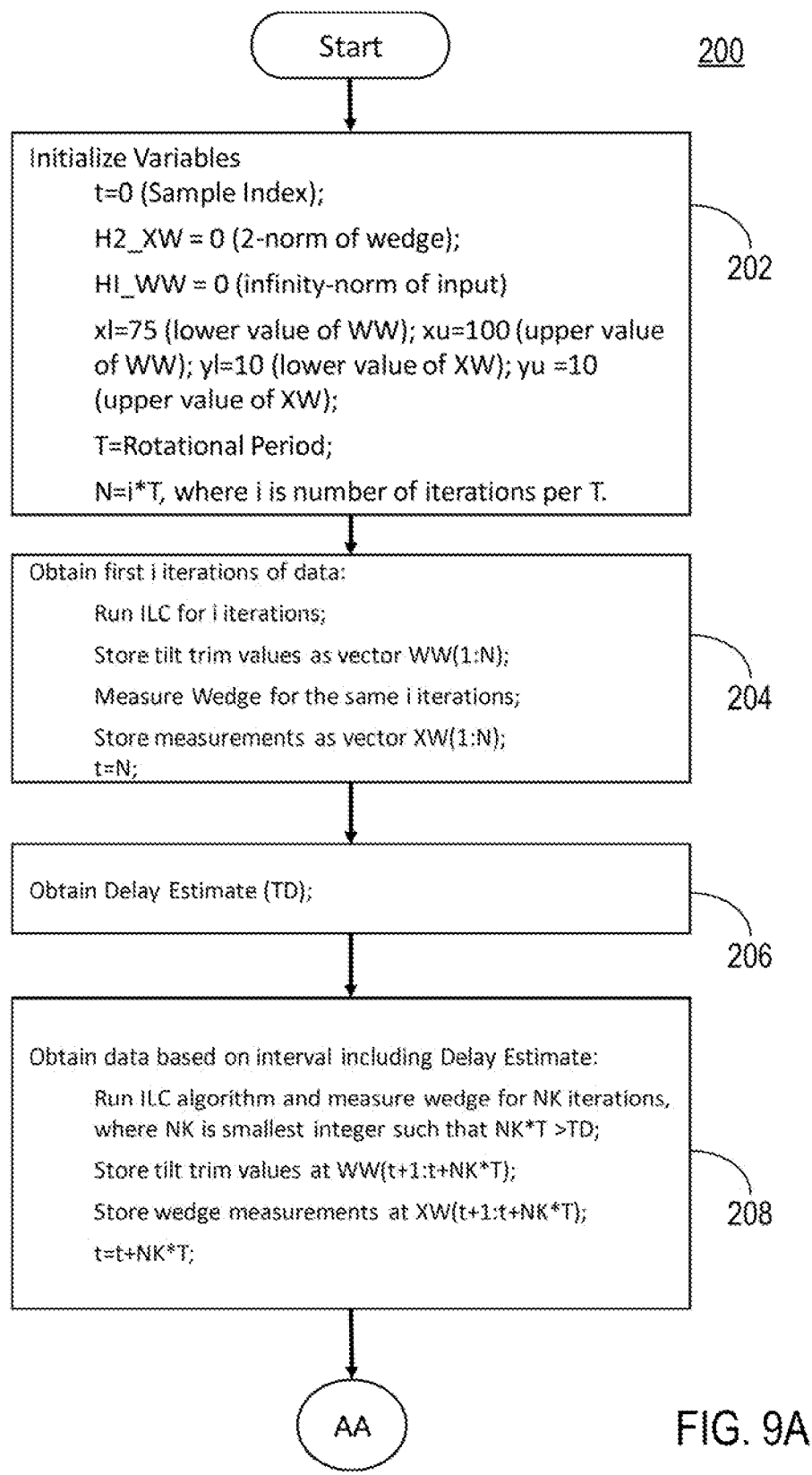
FIGS. 9A and 9B comprise a flowchart of an example of a fault control algorithm according to an additional aspect of the present invention.
Figure 9B:
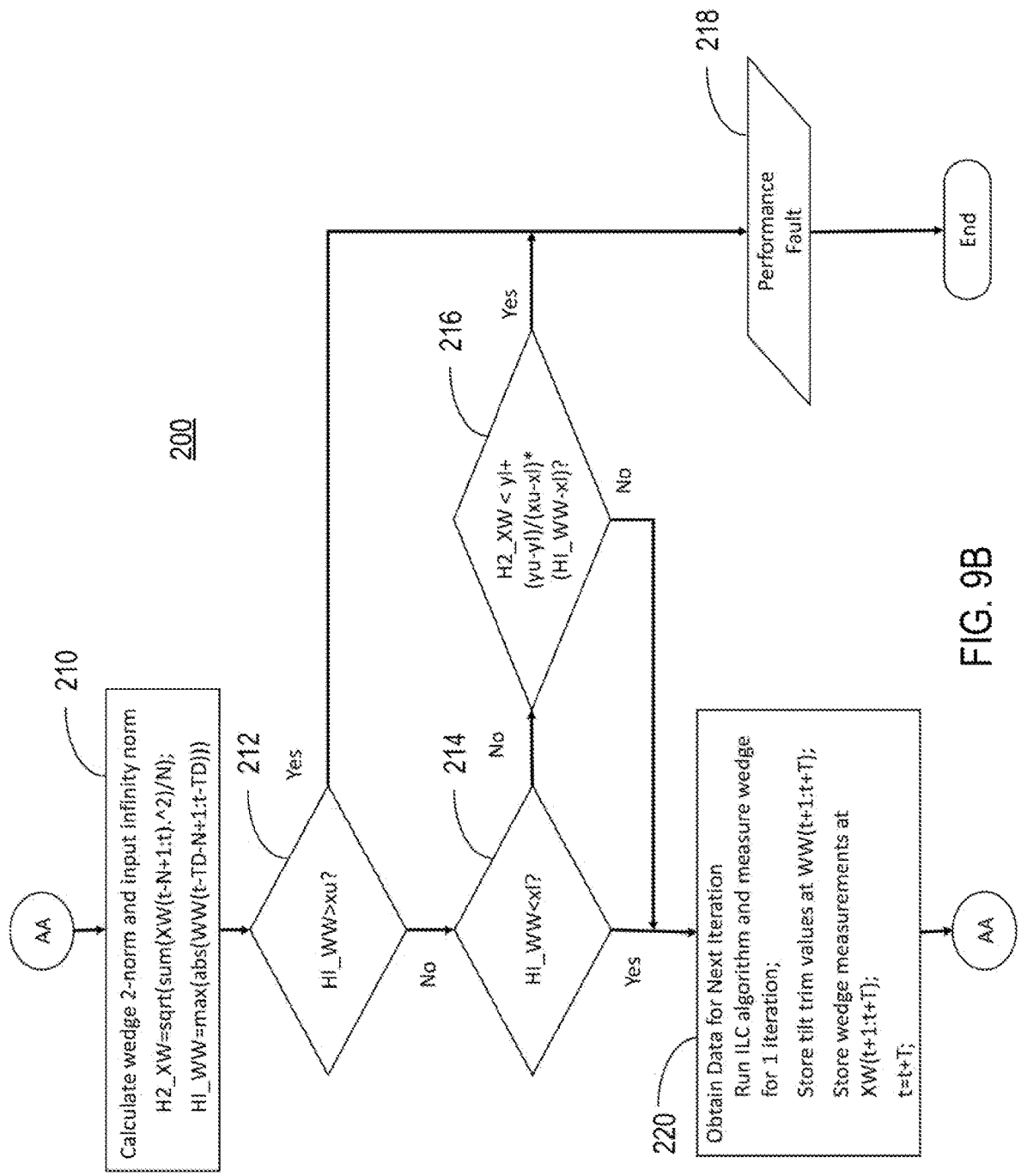

In some embodiments of the wedge controller, a Fault Detection algorithm 104 is incorporated as illustrated in FIG. 1 in the feedback loop from the plant to the Iterative Learning Control 100. Fault Detection algorithm 104 receives the control signal from the ILC Controller and error signal from the plant 102, and provides a fault response signal to the ILC Controller. One example of a Fault Detection Algorithm is illustrated in FIGS. 9A and 9B.

The wedge controller uses an iterative learning control (ILC) algorithm to calculate a casting roll tilt signal for roll revolution k+1 (denoted as $u_{k+1}$) using a previous control input signal (denoted in the block diagram as $u_k$) and the wedge error signal $e_k$ produced by the plant operating in response to the input signal $u_k$. U.S. Pat. No. 10,449,603 discloses how to incorporate delay compensation in the ILC formulation. In this example, that functionality is assumed to be contained in the ILC and plant blocks with the delay estimation and forward projection of the error signal occurring in the plant block and the ILC calculation delay occurring in the ILC block. However, the Fault Detection techniques disclosed herein also have utility when used in combination with ILC Controllers that do not perform delay estimation or compensation.

The fault detection algorithm used in some embodiments of the wedge controller examines the ∞-norm value of $u_k$ and the 2-norm of the ex and tries to detect 1) when the input signal approaches a soft saturation limit that the main process controller places on the wedge controller and 2) when the wedge controller has become unstable. In some embodiments, this is done by using the following criterion to define a region of satisfactory performance in the $\|u_k\|_\infty$ vs. $\|e_k\|_2$ space. The region of satisfactory performance is defined by union of the following conditional inequalities:

$$\|u\|_\infty < 80 \; \mu m,$$

$$\|e\|_2 > 10 + \frac{34 - 10}{110 - 80} (\|u\|_\infty - 80) \; \mu m, \text{ if } 80 \; \mu m \leq \|u\|_\infty < 110 \; \mu m$$

$$\|u\|_\infty < 110 \; \mu m, \text{ if } \|e\|_2 \geq 34 \; \mu m$$

The constraint of $\|u\|_\infty < 110$ μm is based on the soft saturation limit on the wedge controller imposed by the main process controller. The other values are based on empirical data obtained when the algorithm started to become unstable. These values will vary depending on the system subject to the ILC Controller. Note that relationship between the vector norm definitions can be used to redefine the inequalities in a form that uses the same p-norm for both vectors, similar to the expression used in Eq. (5).

In the event that the ILC leaves the region of satisfactory performance, in some embodiments, the Fault Detection algorithm detunes the ILC algorithm and the system returns to the region of satisfactory performance. Specifically, the Fault Response is to decrease the value of Q when a fault is detected. This has been shown to increase the robustness of the ILC system, but also degrade the optimal performance of the wedge controller.

The above example of a fault detection algorithm includes specific values adapted to a specific twin roll caster. However, the fault detection algorithm and a method of using the algorithm may be expressed more generally to allow adaptation to other casters. Referring to FIGS. 9A and 9B, a fault detection algorithm 200 is initialized in step 202. A sample index is set to t=0, with a trim tilt input having a lower value xl and an upper value xu set to values appropriate to the caster. A wedge signal may also have lower value yl and an upper value yu, which are also set to values appropriate to the caster. In the illustrated example, xu=100, xl=75 yu=35 and yl=10. However, these are design parameters which may vary from application to application. The caster may have a rotational period of T samples per rotation (iteration). The caster may also have multiple rotations i and N may represent the total number of samples in the i rotations N=i*T. In one example, i=10, and N=10*T. However, the number of iterations per rotational period is arbitrary and may be adjusted as desired.

First iterations of data are obtained in step 204. The caster may be operated for 10 iterations (or whatever is selected for i) and trim tilt input stored as a vector WW(1:N) and wedge measurements stored as a vector XW(1:N).

For applications having a delay between casting and measurement, delay estimate TD is obtained in step 206. This may be obtained as described above.

Data is obtained based on an interval including the delay estimate in step 208. The ILC algorithm is run and wedge measured for NK iterations, where NK is smallest integer such that NK*T>TD. Tilt trim values are stored at W(t+1: t+NK*T) and wedge measurements are stored at XW(t+1: t+NK*T). The sample index is updated to t=t+NK*T.

In step 210, the 2-norm of the wedge signal is calculated as H2_XW=sqrt(sum(XW(t−N+1:t)·^2)/N) and the infinity norm (co-norm) of the tilt trim input calculated as HI_WW=max(abs(WW(t−TD−N+1:t−TD))). In the illustrated example, H2_XW and HI_WW are initially set to zero in step 202.

In step 212, the co-norm of the input HI_WW is evaluated as follows. If HI_WW exceeds the trim tilt upper value xu, a performance fault is indicated and the algorithm proceeds to step 218. If H_WW is less than the trim tilt upper value xu, the algorithm proceeds to step 214 and HI_WW is evaluated against x. If HI_WW is less the trim tilt lower value xl, no performance fault is indicated and the algorithm proceeds to step 220. If HI_WW is between the trim tilt upper value and lower value, the 2-norm of the wedge signal H2_XW is evaluated in step 216 as follows. If H2_XW is less than yl+(yu−yl)/(xu−xl)*(HI_WW−xl), a performance fault is indicated and the algorithm proceeds to step 218. H2_XW is greater than yl+(yu−yl)/(xu−xl)*(HI_WW−xl), no performance fault is indicated and the algorithm proceeds to step 220.

If a performance fault is indicated and the algorithm proceeds to step 218, the algorithm ends. For iterations where no performance fault is indicated and the algorithm proceeds to step 220, data is obtained for the next iteration. The ILC algorithm is run and wedge measured for an additional iteration. Tilt trim input values are stored at WW(t+1:t+T) and wedge measurements are stored at XW(t+1:t+T), and t updated to t=t+T. The algorithm then returns to step 210 and ∞-norm of the input HI_WW and 2-norm of the wedge signal H2_XW are then recalculated and evaluated as above.

In some embodiments the values of the current inequalities and/or add additional constraints are adjusted in the form of Eq. (5) to detect when other types of performance specifications are not being met. This may be especially useful to expand the control objective to include other types of periodic disturbances that occur during a twin roll thin strip casting process.

It will be appreciated that any method described herein utilizing any iterative learning control method as described or contemplated, along with any associated algorithm, may be performed using one or more controllers with the iterative learning control methods and associated algorithms stored as instructions on any memory storage device. The instructions are configured to be performed (executed) using one or more processors in combination with a twin roll casting machine to control the formation of thin metal strip by twin roll casting. Any such controller, as well as any processor and memory storage device, may be arranged in operable communication with any component of the twin roll casting machine as may be desired, which includes being arrange in operable communication with any sensor and actuator. A sensor as used herein may generate a signal that may be stored in a memory storage device and used by the processor to control certain operations of the twin roll casting machine as described herein. An actuator as used herein may receive a signal from the controller, processor, or memory storage device to adjust or alter any portion of the twin roll casting machine as described herein.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

What is claimed is:

1. A twin roll casting system, comprising:
    a pair of counter-rotating casting rolls having a nip between the casting rolls and capable of delivering a cast strip downwardly from the nip, the nip being adjustable;
    a casting roll controller configured to adjust the nip between the casting rolls in response to control signals;
    a cast strip sensor capable of measuring at least one parameter of the cast strip and generating strip measurement signals; and
    an iterative learning control (ILC) controller coupled to the cast strip sensor to receive the strip measurement signals from the cast strip sensor and coupled to the casting roll controller to provide the control signals to the casting roll controller, the ILC controller including:
        a fault detection algorithm receiving the control signals and the strip measurement signals and generating a fault detection signal to indicate when a fault condition is detected; and
        an iterative learning control algorithm to generate the control signals based on the strip measurement signals and the fault detection signal;
        wherein the fault detection algorithm indicates a fault condition when it detects at least one of the control signals exceeding an upper control saturation threshold or the ILC controller operating a state that is not guaranteed as stable.

2. The system of claim 1, wherein an infinity norm (∞-norm) of the control signals is compared to the upper control saturation threshold.

3. The system of claim 1 further comprising a lower control saturation threshold, and the fault detection algorithm indicates a fault condition if an infinity norm (oo-norm) of the control signals exceeds the upper control saturation threshold, and the fault detection algorithm does not indicate a fault condition if the infinity norm of the control signals is less than the lower control saturation threshold.

4. The system of claim 3, wherein, if the infinity norm of the control signals is between the upper and lower control saturation thresholds, the fault detection algorithm indicates a fault condition if a p-norm of an error signal exceeds a threshold which varies as a function of the infinity-norm of the control signal.

5. The system of claim 1, wherein the fault detection algorithm determines that the ILC controller is operating in a state which is not guaranteed to be stable when a current p-norm of an error signal is greater than an initial p-norm of the error signal.

6. The system of claim 1, wherein the fault detection algorithm determines that the ILC controller is operating in the state which is not guaranteed to be stable when a p-norm of the control signal is increasing.

7. The system of claim 1, wherein the ILC controller is configured to re-tune one or more iterative learning control algorithm filters in response to the fault detection signal indicating the fault condition.

8. The system of claim 1, wherein the cast strip sensor comprises a thickness gauge that measures a thickness of the cast strip in intervals across a width of the cast strip.

9. The system of claim 1, wherein the casting roll controller further comprises a dynamically adjustable wedge controller and the nip is adjusted by the wedge controller in response to the control signals from the ILC controller.

10. The system of claim 1, wherein the casting rolls include expansion rings to adjust the nip and the casting roll controller controls the expansion rings in response to the control signals from the ILC controller.

11. The system of claim 1, wherein the cast strip sensor measures the cast strip for at least one periodic disturbance and the iterative learning control algorithm is adapted to decrease a severity of the at least one periodic disturbance.

12. A method of reducing periodic disturbances in a cast strip metal product in a twin roll casting system having a pair of counter-rotating casting rolls producing the cast strip at a nip between the casting rolls, the nip being adjustable by a casting roll controller, an iterative learning control algorithm generating a-control signals, and a fault detection algorithm generating a fault detect signal; the method comprising:
 providing the control signal to the casting roll controller;
 measuring at least one parameter of the cast strip;
 calculating an error signal based on the control signal and the at least one parameter of the cast strip;
 providing the control signal and the error signal to the fault detection algorithm;
 indicating a fault condition via a fault detection signal when the fault detection algorithm determines that an infinity-norm of the control signal exceeds an upper threshold;
 generating the control signals for the casting roll controller by the iterative learning control algorithm based on the error signal and the fault detection signal;
wherein the casting roll controller adjusts the nip in response to the control signals from the iterative learning control algorithm to reduce the periodic disturbances.

13. The method of claim 12 further comprising a lower threshold, and the fault detection algorithm does not indicate the fault condition if the infinity norm of the control signals is less than the lower threshold.

14. The method of claim 13, wherein, if the infinity-norm of the control signals is between the upper and lower thresholds, the fault detection algorithm indicates the fault condition if a p-norm of an error signal exceeds a threshold which varies as a function of the infinity-norm of the control signal.

15. The method of claim 12, further comprising a step of generating the fault detection signal by the fault detection algorithm when a current p-norm of the error signal is greater than an initial p-norm of the error signal.

16. The method of claim 12, further comprising a step of generating the fault detection signal by the fault detection algorithm when a current p-norm of the control signal is increasing.

17. The method of claim 12, further comprising a step of detuning one or more iterative learning controller filters in response to the fault detect signal indicating a fault.

18. The method of claim 12, wherein the casting roll controller controls a dynamically adjustable wedge controller and the nip is adjusted by the wedge controller in response to the control signals.

19. The method of claim 12, wherein the casting rolls include expansion rings to adjust the nip and the casting roll controller controls the expansion rings in response to the control signals.

20. A twin roll casting system, comprising:
 a pair of counter-rotating casting rolls having a nip between the casting rolls and capable of delivering a cast strip downwardly from the nip, the nip being adjustable;
 a casting roll controller configured to adjust the nip between the casting rolls in response to control signals;
 a cast strip sensor capable of measuring at least one parameter of the cast strip and generate strip measurement signals; and
 an iterative learning control (ILC) controller coupled to the cast strip sensor to receive the strip measurement signals from the cast strip sensor and coupled to the casting roll controller to provide the control signals to the casting roll controller, the ILC controller including:
  a fault detection algorithm receiving the control signals and the strip measurement signals and generating a fault detection signal to indicate when a fault condition is detected; and
  an iterative learning control algorithm to generate the control signals based on the strip measurement signals and the fault detection signal;
 wherein the fault detection algorithm indicates a fault condition when it detects that the ILC controller is operating a state that is not guaranteed as stable or when the ILC controller is not meeting predefined performance specifications.

* * * * *